US012807089B1

(12) United States Patent
Khmelev et al.

(10) Patent No.: US 12,807,089 B1
(45) Date of Patent: Nov. 24, 2026

(54) EVENT-BASED DATA AGGREGATION SYSTEMS AND METHODS

(71) Applicant: United Services Automobile Association (USAA), San Antonio, TX (US)

(72) Inventors: Yevgeniy Viatcheslavovich Khmelev, San Antonio, TX (US); Oscar Guerra, San Antonio, TX (US); Jeffrey Neal Pollack, San Antonio, TX (US); Janelle Denice Dziuk, Falls City, TX (US); Ashley Raine Philbrick, San Antonio, TX (US); Ryan Thomas Russell, San Antonio, TX (US); David Patrick Dixon, Boerne, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 38 days.

(21) Appl. No.: 18/965,658

(22) Filed: Dec. 2, 2024

Related U.S. Application Data

(63) Continuation of application No. 18/458,784, filed on Aug. 30, 2023, now Pat. No. 12,157,427, which is a continuation of application No. 16/885,054, filed on May 27, 2020, now Pat. No. 11,745,684.

(60) Provisional application No. 62/860,107, filed on Jun. 11, 2019.

(51) Int. Cl.

| | |
|---|---|
| ***B60R 21/0136*** | (2006.01) |
| ***G06Q 40/08*** | (2012.01) |
| ***G07C 5/00*** | (2006.01) |
| ***G07C 5/08*** | (2006.01) |

(52) U.S. Cl.
CPC ......... *B60R 21/0136* (2013.01); *G06Q 40/08* (2013.01); *G07C 5/008* (2013.01); *G07C 5/0808* (2013.01); *G07C 5/0841* (2013.01)

(58) Field of Classification Search
CPC .... B60R 21/0136; G06Q 40/08; G07C 5/008; G07C 5/0808; G07C 5/0841
See application file for complete search history.

(56) References Cited

U.S. PATENT DOCUMENTS 10,163,349 B1 12/2018 Desai et al.
10,212,570 B1 * 2/2019 Ramalingam ......... H04W 4/025
(Continued)

OTHER PUBLICATIONS

English Translation of TWM541966U; Wang Hong-Guang, Smart Burglarproof Monitor Navigation Positioning Video Host for Vehicle, May 21, 2017, 5 pgs.

*Primary Examiner* — Steven Vu Nguyen
(74) *Attorney, Agent, or Firm* — Fletcher Yoder, P.C.

(57) ABSTRACT

The present disclosure relates generally to aggregation of data associated with events related to automotive vehicles. Automotive vehicles may include a variety of sensing devices used in local sensing operations. However, these sensing devices may not be leveraged beyond the local sensing operations. When automotive vehicles are operated, sometimes events occur. As discussed herein, an event-based data aggregation service may aggregate sensing data from one or more sensing devices, such as sensing devices of the automotive vehicles, in response to receiving an event notification associated with one or more of the events and may use the sensing data when responding to the event notification.

20 Claims, 3 Drawing Sheets

(56) References Cited

U.S. PATENT DOCUMENTS

| | | | | |
|---|---|---|---|---|
| 2016/0093210 | A1* | 3/2016 | Bonhomme | G08G 1/0129 340/905 |
| 2017/0017734 | A1 | 1/2017 | Groh et al. | |
| 2017/0069144 | A1 | 3/2017 | Lawrie-Fussey et al. | |
| 2018/0262724 | A1* | 9/2018 | Ross | G06V 20/40 |
| 2019/0039545 | A1* | 2/2019 | Kumar | B60R 21/013 |
| 2022/0405857 | A1 | 12/2022 | Leise et al. | |

* cited by examiner

EVENT-BASED DATA AGGREGATION SYSTEMS AND METHODS

CROSS-REFERENCE TO RELATED APPLICATION

This application is a continuation of U.S. patent application Ser. No. 18/458,784, entitled "EVENT-BASED DATA AGGREGATION SYSTEMS AND METHODS," filed Aug. 30, 2023, which is a continuation of U.S. patent application Ser. No. 16/885,054, entitled "EVENT-BASED DATA AGGREGATION SYSTEMS AND METHODS," filed May 27, 2020, which claims priority to U.S. Provisional Application No. 62/860,107, entitled "EVENT-BASED DATA AGGREGATION SYSTEMS AND METHODS," filed Jun. 11, 2019, which is hereby incorporated by reference in its entirety for all purposes.

BACKGROUND

The present disclosure relates generally to aggregation of data associated with events related to automotive vehicles.

When automotive vehicles are operated, sometimes automotive-related events occur. These events may be predictable, such an oil growing old and demanding changing, but some events are relatively unpredictable, such as a collision (e.g., between an automotive vehicle and an additional object, such as an additional automotive vehicle, animal, plant or tree, or other suitable obstacle in a path of movement of the automotive vehicle), a tire becoming flat (e.g., devoid of air or having low air pressure), or the like. Furthermore, automotive vehicles may include a variety of sensing devices used in local sensing operations. For example, a local tire pressure sensing operation may use a pressure sensing device. Despite being a wealth of information, these sensing devices used in local sensing operations may not be leveraged beyond the local sensing operations, let alone leveraged to provide information about the event when an event occurs.

BRIEF DESCRIPTION

Certain embodiments commensurate in scope with the originally claimed subject matter are summarized below. These embodiments are not intended to limit the scope of the claimed disclosure, but rather these embodiments are intended only to provide a brief summary of possible forms of the disclosure. Indeed, the present disclosure may encompass a variety of forms that may be similar to or different from the embodiments set forth below.

In an embodiment, a system may include a computing device coupled to an event-sensing device and additional sensing devices. The system may include a data store. The data store may include instructions that when executed cause the computing device to perform operations. The operations may include determining, in response to receiving an event notification corresponding to the event-sensing device, a relevant sensing device from the additional sensing devices based at least in part on a location parameter. The operations may also include polling the event-sensing device for a first sensing data and the relevant sensing device for a second sensing data and receiving the first sensing data from the event-sensing device and the second sensing data from the relevant sensing device. The operations may also include responding to the event notification based at least in part on the first sensing data and the second sensing data.

In another embodiment, a system may include a first sensing device and an event-based data aggregation system. The event-based data aggregation system may receive a notification corresponding to an event involving the first sensing device, wherein, in response to receiving the notification, the event-based data aggregation service may initiate sensing operations of the first sensing device.

In yet another embodiment, a method may include receiving, via an event-based data aggregation service, an event notification corresponding to a first sensing device. The method also may include polling, via the event-based data aggregation service, the first sensing device for a first sensing data and receiving, via the event-based data aggregation service, the first sensing data from the first sensing device. The method may also include responding to the event notification based at least in part on the first sensing data and the event notification.

BRIEF DESCRIPTION OF THE DRAWINGS

These and other features, aspects, and advantages of the present disclosure become better understood when the following detailed description is read with reference to the accompanying drawings in which like characters represent like parts throughout the drawings, wherein.

DETAILED DESCRIPTION

Figure 1:
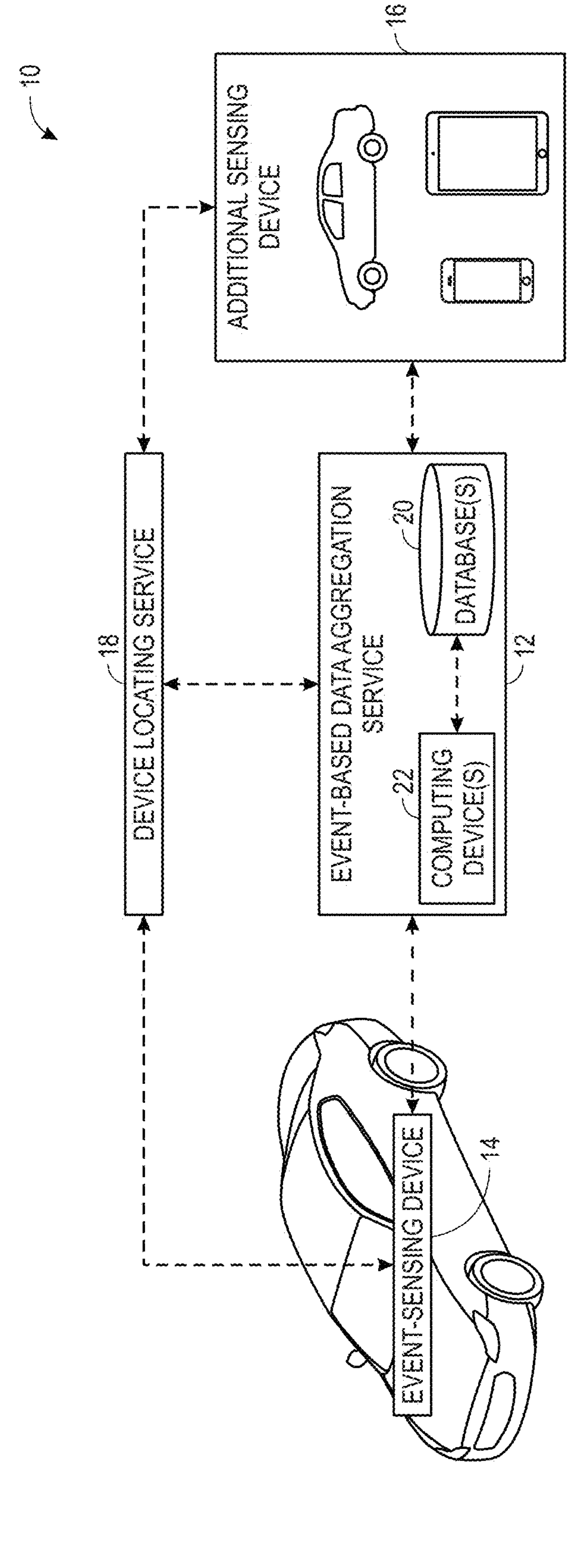
FIG. 1 is a schematic diagram of an event-based data aggregation system, in accordance with embodiments of the present technique.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments are directed toward systems and methods for providing an event-based data aggregation service to be used in response to detected events associated with automotive vehicles. An "automotive vehicle," as used herein, refers to any suitable machine or system used for transporting passengers and/or cargo, including but not limited to: cars, pickup trucks, motorcycles, tractor trailers, recreational vehicles (RVs), all-terrain vehicles (ATVs), water vehicles (e.g., jet skis, boats, yachts), trains, helicopters, planes, and so forth. An "impact event," as used herein, refers to a rapid acceleration experienced by at least a portion of an automotive vehicle, such as due to a collision or road hazard (e.g., pot holes, curbs, roadway debris), that may trigger activation of the disclosed event notification. A "rapid acceleration," as used herein, refers to an acceleration of the vehicle, positive or negative (e.g., deceleration), that is greater than a predetermined threshold (e.g., greater than 3 g, greater than 5 g, greater than 10 g on the g-force scale) and that occurs in a brief period of time (e.g., on the order of microseconds or milliseconds).

With an advent of internet of things (IoT) electronic devices, improved sensing device technologies, proliferation of wireless communication, and so on, electronic device integration into automotive vehicles is increasingly common. The electronic devices integrated into the automotive vehicle may be used for local operations, such as determining whether a tire pressure is low, to control a playing of music (e.g., indicate a volume at which music is outputted via speakers), to provide sensing data for enabling an automotive vehicle to drive itself (e.g., cruise control, self-driving automotive vehicles), or the like. It may be advantageous to access the datasets (e.g., sensing data) generated by the various electronic devices of the automotive vehicle to leverage in global operations and/or operations relatively external to the automobile vehicle.

For example, it may be advantageous for a data aggregation system to retrieve data from the various electronic devices of the automotive vehicle to supplement writing and/or verifying of claims submitted in response to an event associated with the automotive vehicle. For example, an operator of the automotive vehicle (or a sensing device of the automotive vehicle) may submit a claim in response to determining an event associated with the automotive vehicle occurred. It may be an improvement to verification and management of the claim and/or report to have a third-party system or centrally managed system (e.g., not owned by the operator of the automotive vehicle) to aggregate sensing data associated with the event (including any sensing data from the automotive vehicle, any other relevant electronic device data from the automotive vehicle, any other relevant sensing devices from nearby witnesses to the event and/or nearby automotive vehicles, or the like) and use the aggregated sensing data when determining how to respond to the claim. As an example, a car may be involved in a collision with a bus. The car (e.g., a sensing device of the car) may detect that it was involved in a collision (e.g., an event) and may transmit an event notification to the data aggregation system in response to detecting the collision. The data aggregation system may determine which other, if any, sensing devices are relevant to the collision (e.g., a sensing device of the bus, for example) and poll those relevant sensing devices, including the car or the automobile associated with the event notification, for sensing data.

For example, the data aggregation system may receive an event notification from the car indicating the collision and may determine that a sensing device of the bus is relevant to the event. Thus, the data aggregation system may poll additional sensing devices of the car, as well as the sensing device of the bus, to enhance information associated with the event notification. In this way, the data aggregation system may retrieve acceleration sensing data from the car, audio sensing data from the car, and image sensing data from the bus, and use this collection of sensing to corroborate or deny a time line associated with the event notification. For example, the audio sensing data from the car may indicate that music was playing too loudly in the car (e.g., sensed audio levels of the car exceed an audio threshold), and may determine (e.g., from the audio sensing data in combination with the image sensing data from the bus) that the car was at fault in the collision. This enables the data aggregation system to facilitate in claim verification and/or claim resolution based on the sensing data instead of based on operator claims, operator stories, or other unverifiable information. It is noted that an event notification may be transmitted to the data aggregation system by any suitable electronic or computing device, including sensing devices of a witnessing automotive vehicle (e.g., that includes at least one electronic and/or computing device capable of detecting an event occurred), via a claim submission from an additional computing device uninvolved with an event, or the like.

With this in mind, the event notification may include a location parameter that defines where the event occurred. The location parameter may be specific global positioning service (GPS) coordinates or may be a general location relative to points of interest, local streets, a nearby building, or the like. The data aggregation system may communicate with a device locating service (e.g., a system that provides a device locating service) to determine locations of sensing devices and determine a proximity of each sensing device to the location parameter. The subset of sensing devices within a threshold distance from the location parameter may be identified and/or determined as relevant based on a locational proximity to the event by the data aggregation system, and thus may be polled for respective sensing data corresponding to the event.

Additionally or alternatively, the data aggregation system may poll sensing devices for sensing data based at least in part on which sensing devices are relevant to the event based on a type of event. In this way, the event notification may include a type parameter that defines what type of event the notification corresponds to (e.g., local event, collision, flat tire, broken windshield—random, broken windshield—break-in, broken windshield—third-party debris, or the like). The data aggregation system may know which sensing devices are relevant to poll based at least in part on the type parameter. For example, the data aggregation system may poll local sensing devices without polling the device locating service to determine additional sensing devices based on the broken windshield—random event type parameter, but may determine additional sensing devices when the type parameter indicates that a collision occurred. The event notification may sometimes include a list of available sensing devices within an automotive vehicle and/or associated with the event (such that the data aggregation system does not have to determine which sensing devices are located within the automotive vehicle and/or are associated with the event).

Thus, based at least in part on this information from the event notification, the data aggregation system may poll or not poll certain sensing devices based on these predetermined relevancies. For example, the data aggregation system may determine a type parameter of an event notification indicates a flat tire and may determine that a list of available sensing devices from the event notification indicates the automotive vehicle to include just a pressure sensing device and an image sensing device, and thus the data aggregation system may determine (based on the list of available sensing devices and the type parameter) to poll the pressure sensing device without polling the image sensing device (e.g., a subset of the available sensing devices).

Using techniques described herein, improvements to claim evaluation may improve since sensing data may be aggregated and correlated between witnessing sensing devices and/or participating sensing devices of an event. In this way, the sensing data may be used to corroborate or decline narratives of the event timeline, assign responsible parties (e.g., automotive vehicles) of the event, or the like.

Figure 2:
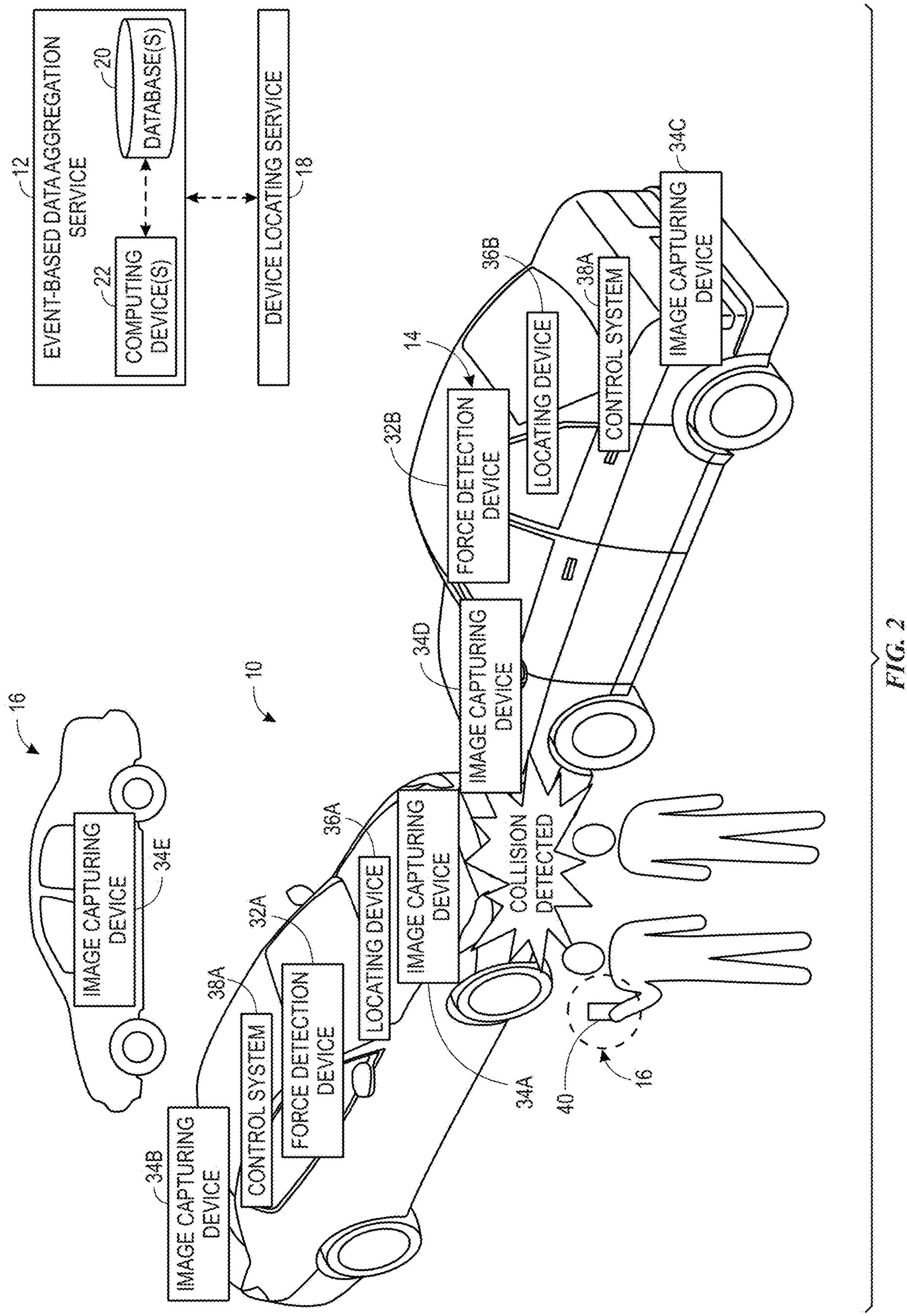
FIG. 2 is a schematic diagram of an example event and an example of the event-based data aggregation system of FIG. 1, in accordance with embodiments of the present technique.

A general example of an event-based data aggregation system 10 is schematically illustrated in FIG. 1 and a more specific example of the event-based data aggregation system 10 is schematically illustrated in FIG. 2. The event-based data aggregation system 10 illustrated in FIGS. 1 and 2 includes an event-based data aggregation service 12 (e.g., a system that provides a data aggregation service and/or an event-based data aggregation service) that is communicatively coupled to one or more portions of additional devices, including an event-sensing device 14, an additional sensing device 16, and a device locating service 18 (e.g., a system that provides a device locating service).

The additional sensing device 16 and/or the event-sensing device 14 may include an image sensing device, an audio sensing device, a force sensing device, a location sensing device (e.g., a geo-location sensing device), an acceleration sensing device (e.g., an accelerometer), or the like. Furthermore, the additional sensing device 16 and/or the event-sensing device 14 may also include a sensing device of an automotive vehicle involved with the event, a sensing device of an automotive vehicle witness to the event (e.g., where "witness" is to mean captures at least a portion of sensing data determined by the event-based data aggregation service 12 to be relevant to the event), an electronic device of an automotive vehicle that generates a dataset that may be leveraged in a similar way as a sensing device. In this way, the additional sensing device 16 and/or the event-sensing device 14 may be any relevant computing device, electronic device, and/or sensing device present during the event or witness to the event, or any suitable data-gathering device capable of recording data during the event that is able to be treated, processed, and/or handed substantially similarly to the sensing data from the sensing devices. This may mean that an electronic device that stores data indicative of a current operational state may also be polled like the additional sensing device 16 and/or the event-sensing device 14. For example, the event-based data aggregation service 12 may determine that a state of operation of a radio is relevant to the event and thus may poll an electronic device that monitors the state of operation of a radio (e.g., audio settings that control an audio level of a radio or speaker output). Any suitable electronic device that stores data indicative of a current operational state may be polled, and thus may include a variety of actuators, components to enable driving, or the like, as long as the electronic device is equipped with a communication interface able to be communicatively coupled to the event-based data aggregation service 12.

With this in mind, the event-sensing device 14 may detect an event related to operation of an automotive vehicle. The event-based data aggregation service 12 may be notified of the event via an event notification from the event-sensing device 14, an event notification from an operator submitting a notification of the event through a software portal (e.g., graphical user interface on a display that permits a claim submission via a submission portal, application, software, and so on, and/or is managed by a same party managing the event-based data aggregation service 12), or the like. The event-based data aggregation system 10, in response to knowing about the event, may poll the event-sensing device 14 to retrieve data that may be associated with the event. The device locating service 18 may also be polled by the event-based data aggregation system 10 to determine which, if any, additional sensing devices 16 were present (e.g., substantially similar location or nearby within a particular threshold distance of the event). In response to determining relevant additional sensing devices 16, the event-based data aggregation system 10 may also poll the additional sensing devices 16 to retrieve data that may be associated with the event.

The retrieved data may be stored in one or more databases 20 by one or more computing devices 22 associated with the event-based data aggregation system 10. The computing devices 22 may include any suitable processing circuitry that may be operably coupled to suitable memory circuitry (e.g., databases 20, memory, storage). In this way, the computing devices 22 may operably couple to one or more processors and/or computing devices that operate based at least in part on executed instructions stored in the suitable memory circuitry, and/or may themselves operated when instructions stored in the suitable memory circuitry are executed. The computing devices 22 may be able to communicatively coupled (e.g., wired coupling, wireless coupling) to suitable sensing circuitry (e.g., event-sensing device 14, device locating service 18, additional sensing device 16) that cooperate to determine that a least a portion of the automotive vehicle has experienced an impact event, the location at which nearby devices were at when the event happened, and/or what data is discernable at the time of the event. Although not particularly depicted, each of these devices may include wireless communication circuitry that is capable of receiving and/or sending wireless communication signals (e.g., WiFi signals, Bluetooth® signals, cellular signals, global positioning system (GPS) signals), such as to receive and/or send messages (or recorded data) to other electronic devices, such as cellular phones, wearable devices (e.g., smart watches, smart glasses), or any other suitable portable electronic devices.

The event notification may include a resolved parameter wherein the event-sensing device 14 and/or an operator may provide an indication to the event-based data aggregation service 12 whether the event is ongoing and/or is generally resolved (e.g., has reached a resolution of the event that may occur before a resolution to the event notification occurs and/or a resolution to a claim or claim submission occurs). The event-based data aggregation service 12 may respond to the event notification in a first manner when the event is ongoing and may response to the event notification in a second manner when the event is generally resolved or resolved. In this way, the first manner may include accelerated detection of relevant additional sensing devices 16 and, in response to determining the relevant additional sensing devices 16, initiating recording of sensing data of the additional sensing devices 16 (if sensing operations are not already ongoing) to capture real-time sensing data corresponding to the event. While responding in the first manner and/or the second manner, the event-based data aggregation service 12 may be relatively more selective in determining which relevant additional sensing devices 16 to initiate sensing operations. In this way, the event-based data aggregation service 12 may prioritize some additional sensing devices 16 over other sensing devices 16 to try to capture relatively more relevant sensing data to the event while the event is ongoing and before a general resolution of the event.

Rules may be referenced by the event-based data aggregation service 12 to determine a priority to assign to relevant sensing devices when initiating sensing operations, polling for sensing data, or the like. A rule may correlate a priority, an action, or the like, to a location parameter, an event type parameter, a type of sensing device, a resolved parameter. For example, when the event is ongoing and the event-based data aggregation service 12 is operating in the first manner, the event-based data aggregation service 12 may initiate sensing operations of relevant personal cellular devices before initiating sensing operations of relevant tire pressure sensing devices since the event-based data aggregation service 12 may determine via a rule that a higher priority is given to personal cellular devices relative to tire pressure sensing devices.

The event-based data aggregation service 12 may stop polling the additional sensing device 16 and/or the event-sensing device 14 in response to an end of an ongoing event, upon determining that a suitable amount of sensing data has been gathered, or the like. In some cases, the event-based data aggregation service 12 may reference known and/or expected durations, historic durations, and/or estimated durations of different event types, may interpret sensing data, and/or may use operator input on a graphical user interface (e.g., such as a graphical user interface presented via a personal computing device, or the like) to determine whether an ongoing event has ended or is at a general resolution.

To help elaborate on the relationship between components of the event-based data aggregation system 10, FIG. 2 is a schematic diagram of an example event and an example of the event-based data aggregation system 10. The example event depicted in FIG. 2 is a collision between two automotive vehicles. However, it should be understood that a variety of suitable events may be detected by event-sensing device 14. For example, a broken window event, a flat tire event, an oil change event, or like. Generally, the event-sensing device 14 may sense events that an owner of an automotive vehicle may submit an insurance claim.

In this example, a force detection device 32B detects a collision (e.g., as the event-sensing device 14). In response to receiving a notification about the collision, the event-based data aggregation service 12 may poll the force detection device 32B to retrieve information associated with the collision. For example, the force detection device 32B may have sensed forces associated with the collision and polling the force detection device 32B may enable the event-based data aggregation service 12 to retrieve the sensed forces among other data or information (e.g., audio at the time of the forces, etc.). The event-based data aggregation service 12 may store the sensed forces and any other information into the databases 20. When storing sensed data from the event-sensing device 14, the event-based data aggregation service 12 may store the sensed data to aggregate and/or to associate the sensed data with any other data retrieved from the automotive vehicle. In this way, the event-based data aggregation service 12 may also retrieve sensed data from devices such as an image capturing device 34C, 34D, a locating device 36B, or any suitable sensing device.

Furthermore, the event-based data aggregation service 12 may automatically poll each of the automotive vehicles associated with the event. For example, in response to a notification of the event, the event-based data aggregation service 12 may automatically determine which automotive vehicles (e.g., sensing devices within or associated with automotive vehicles) are associated with the event and/or which automotive vehicles or additional sensing devices 16 were witness to the event (e.g., such as to provide sensing data to help corroborate stories or claim narratives and/or timelines of events associated with the event). The event-based data aggregation service 12 may determine which devices to poll based at least in part on device location information provided from the device locating service 18. In this way, the event-based data aggregation service 12 may compare the location of the event to each location of devices determined via the device locating service 18 to determine which devices were nearby to the event. The event-based data aggregation service 12 may compare a distance between the event and a particular device to a threshold, where if the distance is greater than or equal to the threshold, the device was not nearby enough to the event to be polled for additional information. It should be understood that a value of the threshold may be relative to a type of event (where different events may use different threshold amounts). Each threshold may be stored in the databases 20, or be otherwise accessible by the event-based data aggregation service 12.

As illustrated, the event-based data aggregation service 12 determined that a mobile phone device 40 and/or an image capturing device 34E of an additional automotive vehicle were located suitably nearby to the event and thus are relevant additional sensing devices 16 for the event. The event-based data aggregation service 12 may poll the additional sensing devices 16 for additional data to supplement any data retrieved from polling the event-sensing device 14 and/or other devices associated with the automotive vehicle of the event-sensing device 14 (e.g., image capturing devices 34C, 34D, locating device 36B) and/or the event notification itself (e.g., the event notification may indicate the other automotive vehicle involved in an event, or other suitable data).

As mentioned above with respect to FIGS. 1 and 2, in certain embodiments, an automotive vehicle may include a control system 38 (e.g., 38A, 38B). Each of the control systems 38 may include a processor and/or memory to communicate with the sensors to determine whether the automotive vehicle has experienced an event. For example, in certain embodiments, the processors of the control systems 38 may each execute instructions stored in the memory to receive sensing data from one or more sensors (e.g., sensors of the image capturing devices 34A, 34B, 34C, 34D, force detection devices 32A, 32B, locating devices 36A, 36B, or the like) operably coupled to the control systems 38, and may detect an event based on the received data. For example, in certain embodiments, the processor may determine that an impact event has occurred based on the detection of a rapid acceleration event in the sensing data, in which an acceleration or a force measurement exceeds a predetermined threshold value (e.g., greater than 3 g, greater than 5 g, greater than 10 g) within a predetermined time window (e.g., microseconds or milliseconds). In response, one or more of the control systems 38 may transmit the event notification to the event-based data aggregation service 12 on behalf of the force detection device 32 (e.g., therefore is the event-sensing device 14 in this example). It is noted that in some embodiments, each force detection device 32 (e.g., 32A, 32B) may include a processor and/or memory used to interpret sensed data to determine whether the automotive vehicle was involved in an event.

Figure 3:
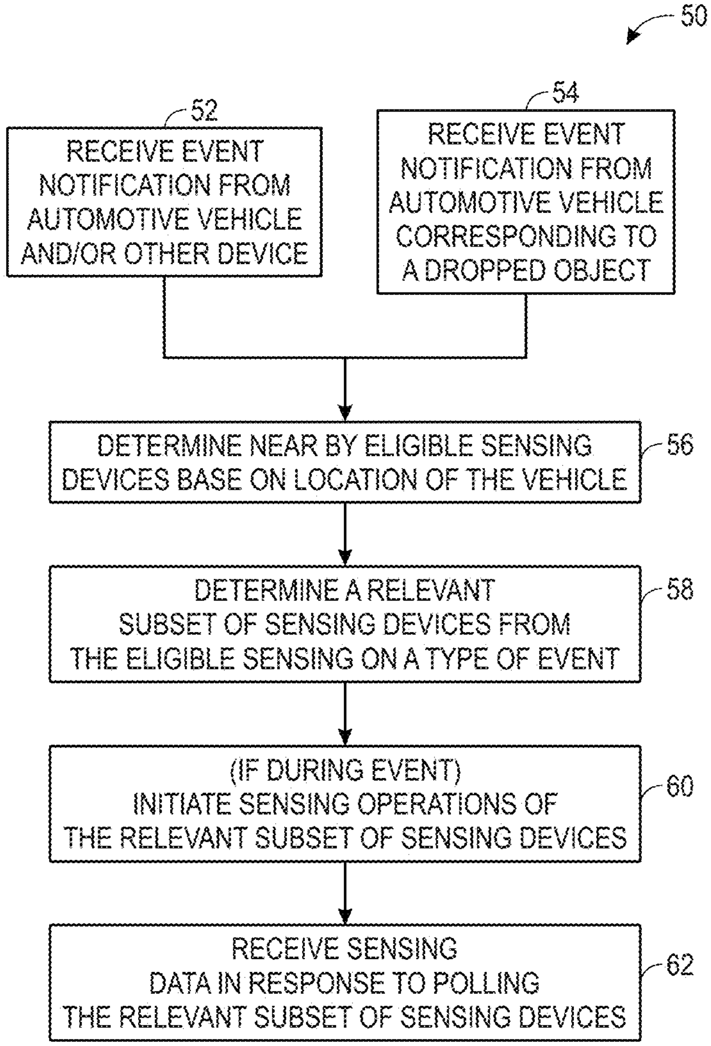
FIG. 3 is a flowchart of a method for aggregating event-based data via an event-based data service of the event-based data aggregation system of FIG. 1, in accordance with embodiments of the present technique.

To help generalize the method of aggregating sensing data associated with the event, FIG. 3 is a flowchart of a method 50 for aggregating event-based data via an event-based data aggregation service of the event-based data aggregation system 10. Although described as performed by the event-based data aggregation service 12, it should be understood that any suitable computing device may perform, or facilitate performing, the method 50. It should be understood that although the method 50 is presented in a particular order, any suitable order may be used to perform the method 50. Furthermore, it should be understood that some or all of the performance of the method 50 may be facilitated by a processor (e.g., computing device) executing instructions stored on a tangible, non-transitory memory, storage device, and/or within a database.

With the forgoing in mind, at block 52, the event-based data aggregation service 12 may receive an event notification from an automotive vehicle and/or other device. The event-sensing device 14 may generate the event notification in response to detecting the event and/or a computing device may transmit the event notification to the event-based data aggregation service 12, such as in response to a claim or work order being submitted via a software, graphical user interface, application, or the like. In some embodiments, at block 54, the event-based data aggregation service 12 may receive the event notification from an automotive vehicle corresponding to a dropped object. The event-sensing device 14 of the automotive vehicle and/or a nearby sensing device witness to the event may detect that an object was dropped by an automotive vehicle (e.g., either the automotive vehicle that detected the event or a nearby automotive vehicle that the event-sensing device 14 witnessed as causing the event). In this way, the event-sensing device 14 may include sensors to detect when it drops an object and/or may include sensors to detect when another vehicle drops an object (e.g., laser-based sensors that monitor a truck bed, image sensors coupled to a processor capable of analyzing image sensing data, or image sensing data converted into video sensing data associated with the event, to determine whether an object was dropped, audio or sonic-based sensors that monitor a truck bed, or the like).

At block 56, the event-based data aggregation service 12 may determine eligible sensing devices based at least in part on the location of the automotive vehicle. The event-based data aggregation service 12 may receive the location of the automotive vehicle (e.g., indicative of a location of an event) from a locating device 36 (e.g., 36A, 36B), a location parameter of the event from the event-sensing device 14 via the event notification, or the like. For example, the event notification may include or be a data packet that includes the location parameter of the event. Based on the location of the event, the event-based data aggregation service 12 may poll the device locating service 18 to determine nearby sensing devices to the event, including nearby electronic devices and/or computing devices that may gather datasets relevant to the event. To do this, the device locating service 18 may track or search for sensing devices based on the location of the event and transmit indications of any eligible sensing devices to the event-based data aggregation service 12. The device locating service 18 may determine an eligible sensing device to be a sensing device within a threshold distance of the event.

In response to receiving a notification indicating which sensing devices are eligible, at block 58, the event-based data aggregation service 12 may determine a relevant subset of sensing devices from the eligible sensing devices to poll for sensing information based at least in part on a type or category of event (e.g., relevant sensing devices). For example, a collision involving two automotive vehicles may cause the event-based data aggregation service 12 to poll a different combination of devices than a collision involving one automotive vehicle, than an event related to a flat tire, or the like. The event-based data aggregation service 12 may poll any of the eligible devices as additional sensing devices 16 for additional information and/or sensing data associated with the event.

In some embodiments, at block 60, the event-based data aggregation service 12 may receive a notification about an event while the event is ongoing (e.g., indicated via the resolved parameter or other suitable method, such as determining from sensing data whether an event is ongoing). For example, the event-based data aggregation service 12 may receive a notification about a collision before a complete collision event has concluded (such as right at a time of collision and before a time of resolution of the collision, for example when parties involved in a collision leave the event location). In these cases, the event-based data aggregation service 12, after receiving information about eligible devices from the device locating service 18, may poll one or more relevant subset of sensing devices for sensing data and instruct the one or more relevant subset of sensing devices to continue recording or start recording.

In response to determining nearby eligible devices and/or initiating sensing via the nearby eligible devices, at block 62, the event-based data aggregation service 12 may receive sensing data in response to polling the relevant subset of sensing devices. The event-based data aggregation service 12 may receive sensing data and use the received sensing data to supplement information submitted in an accident report, an event report, or the like by a party or device associated with the event. It is noted that the relevant subset of sensing devices may include devices of a first automotive vehicle involved in the event, a second automotive vehicle involved in the event (e.g., when the event is a collision), any device witness to the event, any device that may be witness to the event, or the like. This may help the event-based data aggregation service 12 receive sensing data that provides a full data coverage of the event, even when gathering real-time sensing data associated with an ongoing event. For example, the event-based data aggregation service 12 may use the sensing data to corroborate alleged information and/or to prevent fraud associated with resolution outcomes for the event (e.g., insurance payouts, guilty verdicts, or the like). As an additional example, the sensing data may be gathered by the event-based data aggregation service 12 and compared to claim timelines and/or event information submitted by an operator associated with the event.

In some embodiments, the event-sensing device 14 may initiate a claim in response to detecting an event. For example, the event-sensing device 14 may detect a collision (e.g., an event) between two automotive vehicles. The event-sensing device 14 may communicate to the event-based data aggregation service 12 that the collision occurred via a notification in the form of a claim submission. In response to the notification of the event, the event-based data aggregation service 12 may communicate with the device locating service 18 to determine which additional sensing devices 16 to poll for sensing data. The claim submission may have a particular amount of data associated with it that the event-based data aggregation service 12 may combine with additional sensing data based on its communications with the device locating service 18, the event-sensing device 14, and/or the additional sensing device 16. For example, the event-based data aggregation service 12 may poll the device locating service 18 to determine sensing devices eligible to be associated with the collision and may use the sensing data to determine which of the eligible sensing devices were directly involved with the collision, where the sensing devices involved with the collision may be included on a claim and/or associated with the claim submission.

When the sensing data from the sensing device involved with the collision are included in the claim and/or associated with the claim submission, the sensing data may be stored in the database 20 or other suitable data store associated with the event-based data aggregation service 12. The event-based data aggregation service 12 may store the event notification in the database 20 or other suitable data store of the event-based data aggregation service 12. When the event-based data aggregation service 12 receives the sensing data (e.g., the real-time sensing data), the event-based data aggregation service 12 may associate the sensing data with the claim submission and/or with the event notification in the database 20 (or other suitable data store of the event-based data aggregation service 12). Sometimes the event-based data aggregation service 12 may indicate in the database 20 (or other suitable data store of the event-based data aggregation service 12) that the event notification corresponds to a claim submission. In this way, the relationships between the claim submission, the event notification, the sensing data, any real-time sensing data, and indications of sensing devices involved with the event (e.g., at least the event-sensing device 14 and any additional sensing devices 16), may be stored in the database 20 (or other suitable data store of the event-based data aggregation service 12) and retrieved at a later time, such as at a time of claim review, claim submission review, at a request of a participant of the event, or the like. For example, a relationship between the claim submission and the real-time sensing data may be presented via a graphical user interface for review in response to an additional computing device accessing the claim submission.

For example, the relationships between the claim submission, the event notification, the sensing data, any real-time sensing data, and indications of sensing devices involved with the event may be presented via a graphical user interface of a display. In some cases, the relationship between the claim submission and the real-time sensing data may be presented via the graphical user interface in response to an additional computing device accessing the claim submission. The computing devices 22 of the event-based data aggregation service 12 may facilitate in the presentation of and/or present at least a subset of the relationships via the graphical user interface and/or may transmit at least a subset of the relationships for use by another computing device (such as for presentation via a graphical user interface or to be used in additional operations).

Thus, the technical effects of the present disclosure include techniques for improving event-based data aggregation by permitting an aggregation service to poll one or more sensing devices associated with an event to gather sensing data from the sensing devices recorded at substantially similar timeframes as the event. These techniques include considerations for location of the sensing devices and/or for a type of event, such that relevant sensing devices to the event are polled by the aggregation service. The aggregation service may use the sensing data to corroborate alleged information and/or to prevent fraud associated with resolution outcomes for the event (e.g., insurance payouts, guilty verdicts, or the like).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A system, comprising:

a computing device remote from an automotive vehicle and comprising a processing system configured to:

receive an event notification of an event involving the automotive vehicle, wherein the event notification comprises:

an event type indicative of the event being one of a first type of event or a second type of event that is different than the first type of event; and a location parameter indicative of a location of the event;

identify a relevant sensing device perimeter to identify available sensing devices that may have relevant event data corresponding to the event notification, the relevant sensing device perimeter identified as:

a first distance around the location of the event when the event type indicates the first type of event; and a second distance, different than the first distance, around the location of the event when the event type indicates the second type of event;

identify a relevant sensing device type to identify the available sensing devices that may have the relevant event data corresponding to the event notification, the relevant sensing device type identified as:

a first type of sensing device when the event type indicates the first type of event; and a second type of sensing device, different than the first type of sensing device, when the event type indicates the second type of event;

obtain the relevant event data from the available sensing devices, by:

filtering the available sensing devices to identify a first subset of the available sensing devices that are within the relevant sensing device perimeter;

filtering the first subset of the available sensing devices to identify a second subset of the available sensing devices that are of the relevant sensing device type as relevant sensing devices;

issuing an electronic command to the relevant sensing devices to provide the relevant event data; and in response to the electronic command, receiving the relevant event data from the relevant sensing devices; and responding to the event notification based at least in part on the relevant event data.

2. The system of claim 1, wherein:

the first type of event comprises a collision; and the second type of event comprises a flat tire or a broken windshield.

3. The system of claim 2, wherein the first distance is greater than the second distance.

4. The system of claim 1, wherein the event notification is triggered at least in part by a claim submission, wherein the claim submission is received by the computing device from an additional computing device uninvolved with an event associated with the event notification or from an event-sensing device involved with the event associated with the event notification.

5. The system of claim 1, wherein the event notification is received by the computing device prior to a resolution of the event.

6. The system of claim 5, wherein the processing system of the computing device is configured to:

instruct the relevant sensing devices to begin sensing operations;

receive real-time sensing data configured to result from the sensing operations; and associate the real-time sensing data with the event notification in a data store.

7. The system of claim 6, wherein the processing system of the computing device is configured to associate the real-time sensing data with the event notification in the data store, by:

storing in the data store the real-time sensing data;

storing the event notification in the data store as corresponding to a claim submission;

associating the real-time sensing data with the claim submission in the data store; and presenting via a graphical user interface a relationship between the claim submission and the real-time sensing data for review in response to an additional computing device accessing the claim submission.

8. The system of claim 1, wherein the location parameter is received via communication between the computing device and a device location service configured to determine the relevant sensing devices based at least in part on the event notification.

9. The system of claim 1, comprising an event sensing device configured to:

receive, from one or more sensors, sensor data indicative of an occurrence of the event;

identify the occurrence of the event based on the sensor data; and in response to identifying the occurrence of the event, generate and provide the event notification.

10. The system of claim 9, wherein the relevant sensing devices comprises an image sensor, an audio sensor, a force detector, a locating device, an accelerometer, or any combination thereof used to identify the occurrence of the event.

11. A non-transitory, computer-readable medium, comprising computer-readable instructions that, when executed by one or more processors of one or more computers, cause the one or more computers to:

receive an event notification of an event involving an automotive vehicle, wherein the event notification comprises:

an event type indicative of the event being one of a first type of event or a second type of event that is different than the first type of event; and a location parameter indicative of a location of the event;

identify a relevant sensing device perimeter to identify available sensing devices that may have relevant event data corresponding to the event notification, the relevant sensing device perimeter identified as:

a first distance around the location of the event when the event type indicates the first type of event; and a second distance, different than the first distance, around the location of the event when the event type indicates the second type of event;

identify a relevant sensing device type to identify the available sensing devices that may have the relevant event data corresponding to the event notification, the relevant sensing device type identified as:

a first type of sensing device when the event type indicates the first type of event; and a second type of sensing device, different than the first type of sensing device, when the event type indicates the second type of event;

obtain the relevant event data from the available sensing devices, by:

filtering the available sensing devices to identify a first subset of the available sensing devices that are within the relevant sensing device perimeter;

filtering the first subset of the available sensing devices to identify a second subset of the available sensing devices that are of the relevant sensing device type as relevant sensing devices;

issuing an electronic command to the relevant sensing devices to provide the relevant event data; and in response to the electronic command, receiving the relevant event data from the relevant sensing devices; and responding to the event notification based at least in part on the relevant event data.

12. The non-transitory, computer-readable medium of claim 11, wherein:

the first type of event comprises a collision; and the second type of event comprises a flat tire or a broken windshield.

13. The non-transitory, computer-readable medium of claim 12, wherein the first distance is greater than the second distance.

14. The non-transitory, computer-readable medium of claim 11, wherein the event notification is triggered at least in part by a claim submission.

15. The non-transitory, computer-readable medium of claim 11, wherein the event notification is received prior to a resolution of the event, the computer-readable medium comprising computer-readable instructions that, when executed by the one or more processors, cause the one or more computers to:

instruct the relevant sensing devices to begin sensing operations;

receive real-time sensing data configured to result from the sensing operations; and associate the real-time sensing data with the event notification in a data store, by:

storing in the data store the real-time sensing data;

storing the event notification in the data store as corresponding to a claim submission;

associating the real-time sensing data with the claim submission in the data store; and presenting via a graphical user interface a relationship between the claim submission and the real-time sensing data for review in response to an additional computing device accessing the claim submission.

16. The non-transitory, computer-readable medium of claim 11, comprising computer-readable instructions that, when executed by the one or more processors, cause the one or more computers to:

identify occurrence of the event based upon sensing data of an image sensor, an audio sensor, a force detector, a locating device, an accelerometer, or any combination thereof; and in response to identifying the occurrence of the event, generate and provide the event notification.

17. A computer-implemented method, comprising:

receiving an event notification of an event involving an automotive vehicle, wherein the event notification comprises:

an event type indicative of the event being one of a first type of event or a second type of event that is different than the first type of event; and a location parameter indicative of a location of the event;

identifying a relevant sensing device perimeter to identify available sensing devices that may have relevant event data corresponding to the event notification, the relevant sensing device perimeter identified as:

a first distance around the location of the event when the event type indicates the first type of event; and a second distance, different than the first distance, around the location of the event when the event type indicates the second type of event;

identifying a relevant sensing device type to identify the available sensing devices that may have the relevant event data corresponding to the event notification, the relevant sensing device type identified as:

a first type of sensing device when the event type indicates the first type of event; and a second type of sensing device, different than the first type of sensing device, when the event type indicates the second type of event;

obtaining the relevant event data from the available sensing devices, by:

filtering the available sensing devices to identify a first subset of the available sensing devices that are within the relevant sensing device perimeter;

filtering the first subset of the available sensing devices to identify a second subset of the available sensing devices that are of the relevant sensing device type as relevant sensing devices;

issuing an electronic command to the relevant sensing devices to provide the relevant event data; and in response to the electronic command receiving the relevant event data from the relevant sensing devices; and responding to the event notification based at least in part on the relevant event data.

18. The computer-implemented method of claim 17, wherein:

the first type of event comprises a collision; and the second type of event comprises a flat tire or a broken windshield; and the first distance is greater than the second distance.

19. The computer-implemented method of claim 17, comprising:

instructing the relevant sensing devices to begin sensing operations;

receiving real-time sensing data configured to result from the sensing operations; and associating the real-time sensing data with the event notification in a data store, by:

storing in the data store the real-time sensing data;

storing the event notification in the data store as corresponding to a claim submission;

associating the real-time sensing data with the claim submission in the data store; and presenting via a graphical user interface a relationship between the claim submission and the real-time sensing data for review in response to an additional computing device accessing the claim submission.

20. The computer-implemented method of claim 17, comprising:

identifying occurrence of the event based upon sensing data of an image sensor, an audio sensor, a force detector, a locating device, an accelerometer, or any combination thereof used to identify the occurrence of the event; and in response to identifying the occurrence of the event, generating and providing the event notification.

* * * * *